United States Patent [19]

Strahsner et al.

[11] 4,193,778
[45] Mar. 18, 1980

[54] DEVICE FOR REMOVING DUST-SHAPED PARTICLES FROM AN AIR STREAM SERVING FOR THE VENTILATION OF MINES

[75] Inventors: Emanuel Strahsner; Alfred Zitz, both of Zeltweg, Austria

[73] Assignee: Vereinigte Osterreichische Eisen- und Stahlwerke—Alpine Montan Aktiengesellschaft, Vienna, Austria

[21] Appl. No.: 849,617

[22] Filed: Nov. 8, 1977

[30] Foreign Application Priority Data

Nov. 12, 1976 [AT] Austria ................. 8432/76

[51] Int. Cl.² .............. B01D 45/12; B01D 47/10; B01D 50/00
[52] U.S. Cl. .................. 55/238; 55/257 C; 55/259; 55/385 D; 261/DIG. 54
[58] Field of Search .......... 55/238, 226, 259, 257 C, 55/385 D, DIG. 29; 261/DIG. 54, 118, 116

[56] References Cited

U.S. PATENT DOCUMENTS

| | | | |
|---|---|---|---|
| 2,797,904 | 7/1957 | Voorheis | 261/DIG. 54 |
| 3,085,793 | 4/1963 | Pike et al. | 261/DIG. 54 |
| 3,173,771 | 3/1965 | Barrett et al. | 55/238 |
| 3,620,510 | 11/1971 | Longcore | 55/238 |
| 3,724,172 | 4/1973 | Wood | 55/DIG. 29 |
| 3,800,513 | 4/1974 | Lappin et al. | 55/238 |
| 3,802,158 | 4/1974 | Ohle | 55/259 |
| 3,843,461 | 10/1974 | Allen | 55/DIG. 29 |
| 3,993,460 | 11/1976 | Gooch et al. | 55/238 |

FOREIGN PATENT DOCUMENTS

| | | | |
|---|---|---|---|
| 942204 | 2/1974 | Canada | 55/DIG. 12 |
| 2516767 | 10/1976 | Fed. Rep. of Germany | 55/238 |

OTHER PUBLICATIONS

Farr, High Performance Air Filter, Bulletin B-13-00-11A.

Primary Examiner—Frank W. Lutter
Assistant Examiner—Gregory N. Clements
Attorney, Agent, or Firm—Cushman, Darby & Cushman

[57] ABSTRACT

A gas scrubber having an air inlet and an air exit, said scrubber comprising: a plurality of venturi tubes having upstream ends and downstream ends, the venturi tubes being arranged parallel to each other; a centrifugal separator in communication with the downstream ends of the venturi tubes; a blower for drawing dust-laden air into the upstream ends of the venturi tubes and then into the centrifugal separator; nozzles for introducing water into the air flowing through the venturi tubes; an inner tubular housing surrounding the venturi tubes; an outer tubular housing surrounding and spaced from the inner tubular housing so as to form a space between the housings; a conduit for conducting air from the blower to the air exit; a funnel widening in the air flow direction so as to have an inlet end and an outlet end of larger cross section than the inlet end, the inlet end being connected to the air exit; and porous air filter material connected completely across the outlet end of the funnel.

8 Claims, 5 Drawing Figures

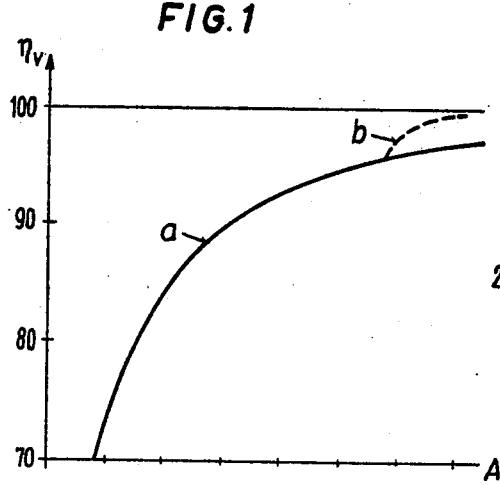
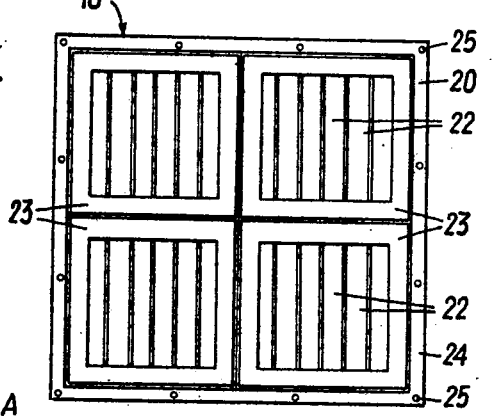
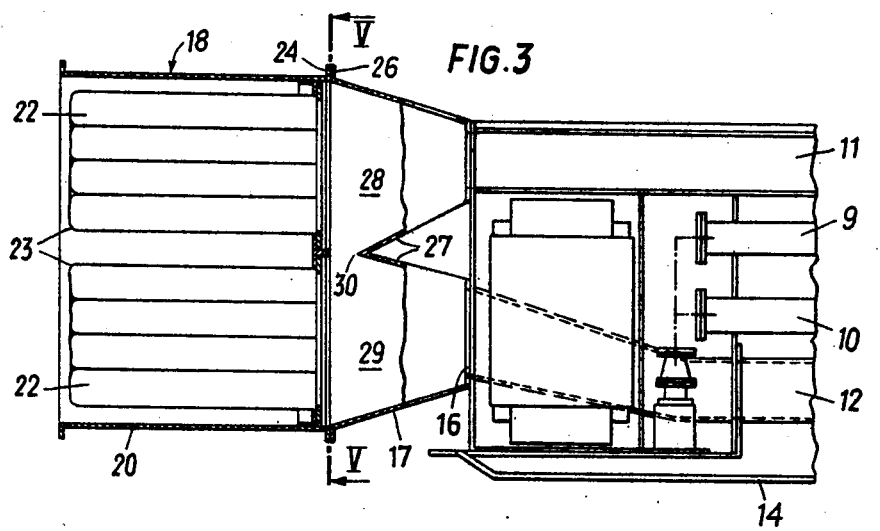
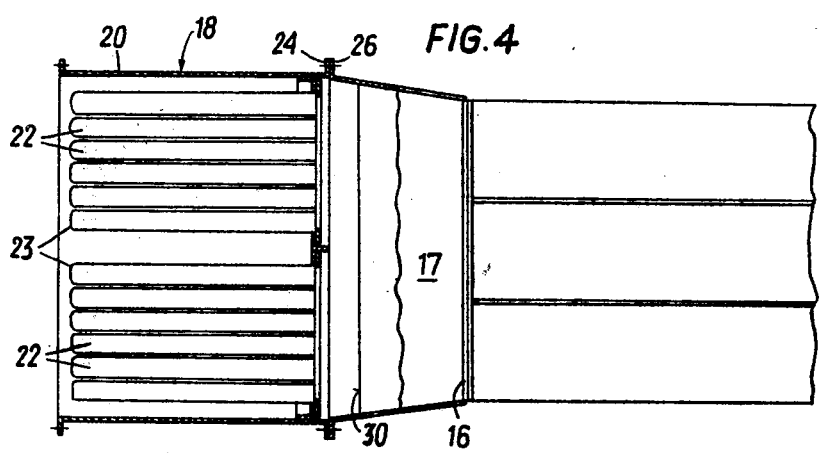

DEVICE FOR REMOVING DUST-SHAPED PARTICLES FROM AN AIR STREAM SERVING FOR THE VENTILATION OF MINES

The present invention refers to a device for removing dust-shaped particles from an air stream serving for the ventilation of mines comprising a gas scrubber in which the dust-loaden air is conveyed through at least one Venturi tube and a centrifugal dust removal appliance by a blower means, noting that water is supplied to the air flowing through the Venturi tube by means of at least one nozzle. The use of Venturi tubes has proved advantageous, however, such Venturi tubes produce a very strong noise which materially affects the work in the mine. The noise produced represents a severe stress for the personnel working in the mine and also implies the danger of accidence because the attentiveness of the personnel is reduced by the noise produced.

The invention aims at at least substantially reducing this noise produced and essentially consists in that the gas scrubber is formed of a plurality of parallelly connected Venturi tubes which are surrounded by an outer housing, thereby keeping free an interspace, and that at least one funnel widening in flow direction is connected to the air exit end of the wet operated dust removal appliance and has its exit end completely covered by a filter consisting of plane or laminar material. By providing a plurality of parallelly connected Venturi tubes, the noise production would only be increased. In view of these Venturi tubes being surrounded by an outer housing keeping free an interspace, the noise production can already be substantially reduced. Such an outer housing does, however, only provide a noise insulation in radial direction. By connecting to the exit end a funnel widening in flow direction, the flow velocity within this funnel is reduced at the exit end thereof and by providing the filter there is achieved a minor flow obstruction within this funnel. Thus, at the exit end of the gas scrubber there results—so to say—an air cushion which is substantially attenuating the noise produced at the exit end. By combining both, the arrangement of the outer housing and the arrangement of the funnel, with the filter covering the exit end of the funnel, there results a roundabout reaching noise insulation and thus a substantial reduction of the noise produced.

According to a preferred embodiment of the invention, the Venturi tubes are mounted within a tubular housing, noting that between this tubular housing and the other housing an interspace filled with water is provided. Thus, the arrangement of the Venturi tubes is as a whole jacketed by a water jacket which does still further improve the sound insulation.

The advantage provided by the filter with respect to the reduction of the noise production is accompanied by a further advantage. In usual gas scrubber, which are only operated with air humidification and a dust removal appliance, for example a centrifugal dust removal appliance, the dust removal efficiency for fine dust amounts to approximately 85 percent and the dust removal efficiency for coarse dust amounts to approximately 99.9 percent, so that there results a total dust removal efficiency of approximately 99.7 percent. The filter connected to the exit end of the filter allows, as has been proved in practice, to increase the dust removal efficiency to a value of 96.7 percent for fine dust and to a value of 100 percent for coarse dust, so that the total dust removal efficiency can be increased to a value of 99.93 percent. Thus, it is clear that the action of the filter provided according to the invention is of particular importance with respect to the fine dust which is a main cause for afflictions of the lungs.

For the desired noise attenuating effect, the increase of the cross section of the funnel in blow direction is of particular importance. Therefore and according to the invention, the cross-section at the exit-end of the funnel is approximately twice to four times, particularly approximately three times, the cross-section of the exit end of the wet operated dust removal appliance.

According to a preferred embodiment of the invention, the filter is a pocket filter. Such a pocket filter has, in view of the pockets formed therein, a very large air exit surface. This arrangement substantially improves attenuation of the noise produced.

The pores of the filter shall be so small that dust which tends to enter the lungs is retained by the filter. Therefore, the filter material has, according to the invention preferably a pore width of maximally 100 $\mu$m, particularly of maximally 50 $\mu$m.

The invention is further illustrated with reference to the drawing showing an embodiment of the invention.

The diagram shown in FIG. 1 illustrates the degree of dust removal in dependence on the energy consumption.

FIGS. 3, 4 and 5 show the filter in an enlarged scale, FIG. 3 representing a vertical cross-section, FIG. 4 showing a horizontal cross-section and FIG. 5 showing a section along line V—V of FIG. 3.

Figure 2:
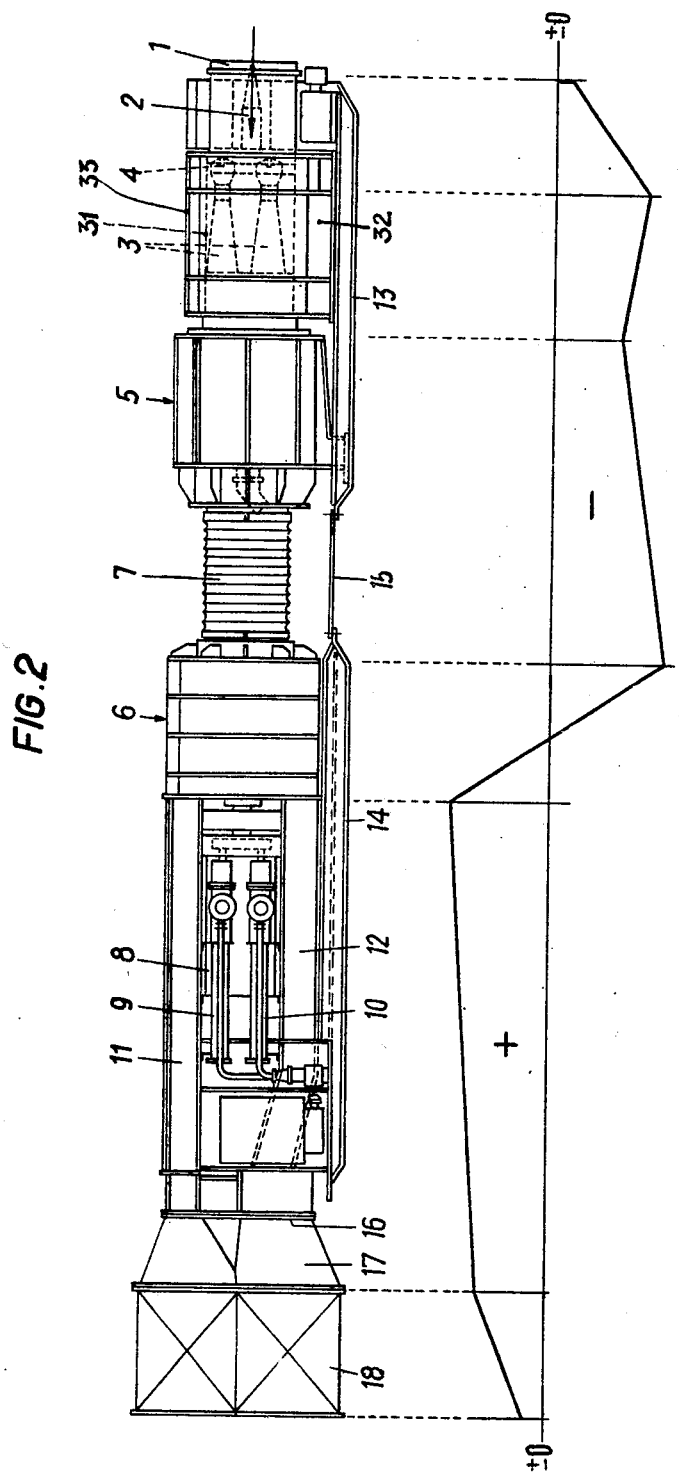
FIG. 2 shows the dust removal appliance in total.

The diagram of FIG. 1 shows the curve a according to which dust removal is effected within a device which only comprises an air humidifying means and a centrifugal dust removal appliance. This curve a corresponds to the equation, $$\eta_v = 1 - e^{-f(\sqrt{A})},$$

in which, $\eta_v$ is the degree of dust removal,
f is a parameter and
A is the energy consumption.

In the diagram shown, the degree of dust removal $\eta_v$ is shown in percent on the ordinate. The energy consumption A is shown on the abscissa. There results, that this curve asymptotically comes close to the value of 100 percent and does, however, not reach this value. The curve b illustrates the effect achieved by using the filter according to the invention.

In the complete arrangement shown in FIG. 2 1 is the connecting point for the air suction duct, through which air sucked from the mine face is entering in direction of arrow 2. 3 are Venturi tubes through which the air flows in direction of arrow 2, noting that water is being supplied by nozzles 4 in finely divided form. 5 is a centrifugal dust removal appliance. 6 is a blower means, which sucks the air and is conveying the air indirection of arrow 2. The blower means 6 is connected to the centrifugal dust removal appliance 5 by means of a bellows 7. 8 is a drive motor for the blower means. 9 is the fresh water pump supplying water to the nozzles 4. 10 is the sludge pump which sucks the water containing sludge out of the housing of the centrifugal dust removal appliance 5. 11 and 12 are channels through which the air sucked by the blower means 6 is flowing off. 13 and 14 are sledge runners, which are mutually connected with one another by means of a rod 15 and on which the device can be shifted as a whole in direction to the mine face in dependence on progressing exploitation. The Venturi tubes 3 are surrounded by a tubular housing 31. The space 32 between this tubular housing 31 and the outer housing 33 is filled with water and forms a water jacket surrounding the tubular housing 31. It is for instance possible to introduce into this space 32 that water which comes from the centrifugal dust removal appliance 5 and being contaminated with dust particles, noting that within this space 32 a separating device for separating the dust particles from the water can be provided so that the water to be supplied to the nozzles 4 can be taken from this space 32. 16 is the air exit end through which the air emerges from the wet operated dust removal appliance formed by the Venturi tube 3, the spray nozzles 4, the centrifugal dust removal appliance 5 and the blower means 6. An air filter 18, formed of a plane or laminar material, for instance of a tissue or of a fleece of water-resistant material such as glass fibres, fibrous synthetic plastics material or the like, is connected to this air exit end 16 with interposition of a funnel 17.

Below the device shown in FIG. 2, there is shown the pressure distribution line for the pressures existing within the dust removal device. From this distribution line can be derived that there is only a minor pressure drop within the filter and that, therefore, the power for operating the device need only be increased for a relatively small amount for the purpose of increasing the air pressure in front of the filter to the required level.

The air filter 18 and the funnel-shaped connecting piece 17 is shown in an enlarged scale in FIGS. 3, 4 and 5. The channels 11 and 12, through which the air conveyed by the blower means 6 is flowing off and which extend over the whole width of the housing of the dust removal appliance, are opening into the funnel 17. 27 are oblique walls subdividing the funnel 17 into two funnel portions 28 and 29 which combine with one another at 30. The filter 18 consists of four filter elements 23 into which filter pockets 22 or closed-end filter bags are inserted which consist of water-resistant material and through which the air is emerging. The filter elements 23 are introduced into a filter casing 20. In view of the air stream entering the filter already having been freed of dust for a value of 99.6 percent, only a small amount of dust is retained within the filter pockets so that the filter pockets have a relatively long life time. The flange 24 of the filter casing 20 is provided with holes 25 which can be used for screwing the casing to a flange 26 of the funnel-shaped connecting piece 19. After loosening said screws, the filter pockets can easily be interchanged.

We claim:

1. A gas scrubber having an air inlet and an air exit, said scrubber comprising: a plurality of venturi tubes having upstream ends in communicating with the air inlet and having downstream ends, the venturi tubes being arranged parallel to each other; a centrifugal separator in communication with the downstream ends of the venturi tubes; blower means for drawing dust-laden air into the upstream ends of the venturi tubes and then into the centrifugal separator; nozzle means for introducing water into the air flowing through the venturi tubes; an inner tubular housing surrounding the venturi tubes; an outer tubular housing surrounding and spaced from the inner tubular housing so as to form a space between the housings; conduit means for conducting air from the blower means to said air exit; a funnel widening in the air flow direction so as to have an inlet end and an outlet end of larger cross section than the inlet end, the inlet end being connected to said air exit; and porous air filter material connected completely across the outlet end of the funnel.

2. Apparatus as in claim 1 wherein the space between the inner and outer housings is filled with water.

3. Apparatus as in claim 1 wherein the air filter material is in the form of a plurality of parallel closed-end bags.

4. Apparatus as in claim 1 wherein the cross section of the outlet end of the funnel is approximately 2 to 4 times the cross section of the air exit.

5. Apparatus as in claim 4 wherein the cross section of the outlet end of the funnel is 3 times the cross-section of the air exit.

6. Apparatus as in claim 1 wherein the air filter material is water-resistant material.

7. Apparatus as in claim 1 wherein the air filter material has a maximum pore width of 100 μm.

8. Apparatus as in claim 1 wherein the air filter material has a maximum pore width of 50 μm.

* * * * *